United States Patent

[11] 3,601,610

[72] Inventors Tadao Nakamura
Kawasaki-shi;
Shigeaki Nakamura, Kawasaki-shi; Tadao Kohashi, Yokohama, all of, Japan

[21] Appl. No. 774,715
[22] Filed Nov. 12, 1968
[45] Patented Aug. 24, 1971
[73] Assignee Matsushita Electric Industrial Co., Ltd. Osaka, Japan
[32] Priority Nov. 20, 1967, Nov. 20, 1967
[33] Japan
[31] 75023 and 75024

[54] SIGNAL MEMORY DEVICE
3 Claims, 8 Drawing Figs.

[52] U.S. Cl. .......... 250/71, 250/71.5, 250/83.3, 250/211
[51] Int. Cl. .......... G01n 21/38
[50] Field of Search .......... 250/83.3, 71, 71.5, 211, 211 J

[56] References Cited
UNITED STATES PATENTS

| | | | |
|---|---|---|---|
| 2,760,078 | 8/1956 | Youmans | 250/83.3 |
| 3,101,408 | 8/1963 | Taylor | 250/71.5 |
| 3,334,229 | 8/1967 | Makino | 250/71 X |

*Primary Examiner*—Archie R. Borchelt
*Assistant Examiner*—Davis L. Willis
*Attorney*—Stevens, Davis, Miller & Mosher ABSTRACT: A signal memory device having a photoconductor element made from photoconductive cadmium sulfide, cadmium selenide or their solid solution doped with impurities. The device utilizes the phenomenon that the photoconductivity of the photoconductor appearing as a result of excitation with radiation at low temperatures persists even after the radiation ceases to project on the photoconductor element.

INVENTORS
TADAO NAKAMURA
SHIGEAKI NAKAMURA
TADAO KOHASHI

BY Stevens, Davis, Miller & Mosher
ATTORNEYS

INVENTORS
TADAO NAKAMURA
SHIGEAKI NAKAMURA
TADAO KOHASHI

BY Stevens, Davis, Miller & Mosher
ATTORNEYS

SIGNAL MEMORY DEVICE

This invention relates to signal memory devices and has for its primary object to provide a signal memory device based on a novel principle that an increased conductivity produced in a photoconductor such as cadmium sulfide (CdS), cadmium selenide (CdSe) or a solid solution of cadmium sulfide and cadmium selenide (i.e., cadmium sulfoselenide) (CdS-Se) each doped with an impurity persists for some time even after radiation producing such a conductive state in the photoconductor has been cut off.

The signal memory device according to the present invention is featured by the fact that a variation in the conductivity occurring as a result of triggering with radiation such as visible light, infrared light, radioactive rays or X-RAYs, or triggering with heat can be stored in the device for a desired period of time and the information so stored can easily be read out or erased. Thus, the signal memory device finds its very useful applications as a single memory element, a two-dimensional memory plate and the like.

The above and other objects, features and advantages of the present invention will be apparent from the following description of several preferred embodiments thereof taken in conjunction with the accompanying drawings, in which.

Figure 1:
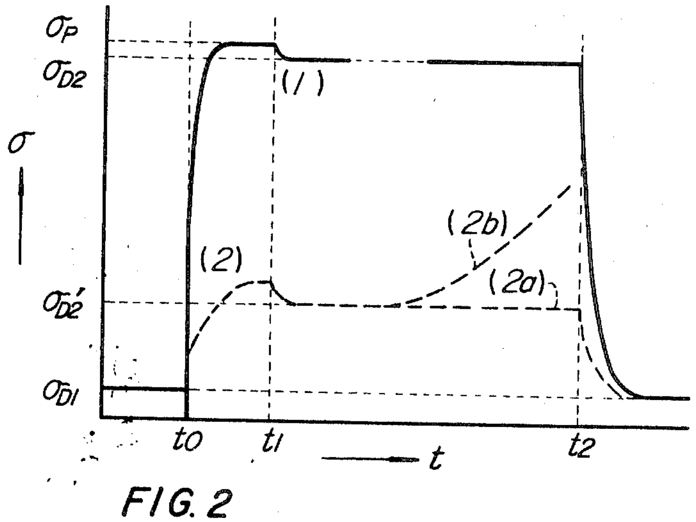
FIGS. 1 and 2 are graphic illustrations of the properties of a photoconductor employed in the signal memory device according to the present invention.

At first, the properties of photoconductive cadmium sulfide, cadmium selenide, and cadmium sulfide-cadmium selenide solid solution doped with an impurity will be described in detail as these photo conductors form the most important component of the signal memory device according to the present invention. More specifically, the description will be directed to photoconductive cadmium selenide which shows the most marked effects.

Powdery cadmium selenide or evaporated or sintered cadmium selenide shows good photoconductivity at room temperature when it is doped with an activator of the I*b* Group such as copper and with a coactivator of the VII*b* Group such as chlorine or bromine. However, its dark current decreases gradually as the temperature is further lowered from room temperature. On the other hand, photocurrent relative to a fixed radiation input increases abruptly under low temperatures. FOr example, with a fixed radiation input intensity which gives a bright to dark current ratio of $10^3$ at room temperature, the bright to dark current ratio is increased to $10^5$ at −50° C. and $10^7$ at −100° C. The term "dark current" referred to in the above description is used to denote a current which flows though the photoconductor in the absence of any radiation input when the photoconductor is cooled down from room temperature to lower temperatures. The dark current which flows through the photoconductor in the above-specified state will be designated herein as an intrinsic dark current, and the conductivity appearing in such a state will be designated as an intrinsic dark conductivity.

When the photoconductor is maintained at a suitable low temperature so that it shows the intrinsic dark conductivity and is illuminated with radiation such as visible light or X-rays of suitable intensity, a photocurrent which is very large compared with the intrinsic dark current flows through the photoconductor. While subsequent cutoff of the radiation input causes a slight reduction in the photocurrent, this reduction is negligibly small compared with the high bright to dark current ratio of the order of $10^6$ to $10^7$. Even after such a reduction in the photocurrent, a large current which is about $10^6$ to $10^7$ times as high as the intrinsic dark current is still preserved in the photoconductor. Further, this preserved conductivity level shifts to a sort of saturated state when the intensity of the radiation input is quite high and does not become higher anymore even if the intensity of the radiation input is increased further. The state of conductivity preservation persists for any desired period of time unless the photoconductor is heated up to a certain temperature or is illuminated with infrared rays.

The state of high conductivity described above can rapidly be restored to the state of the intrinsic dark conductivity during any desired period of time when the photoconductor is illuminated with infrared rays or thermic rays or exposed to a temperature above −30° C. Application of voltage to the photoconductor is not necessarily required during the illumination with the radiation, during the state of conductivity preservation, and in the course of restoration to the state of intrinsic dark conductivity from the preserved conductivity level by the infrared rays or the like. In case the quantity of radiation directed to the photoconductor is small, the conductivity can be preserved at any desired level which is lower than the level of $10^6$ to $10^7$ times the intrinsic dark current and which is dependent upon the quantity of the radiation directed thereto. Such as intermediate state of conductivity preservation varies depending on the condition of voltage application. The intermediate conductivity level varies or increases gently under continuous application of a relatively high voltage until it reaches a saturated conductivity level at which the conductivity is finally preserved. The intermediate conductivity preservation level is maintained intact so long as the voltage is low or is not applied at all.

The behavior of the photoconductor described above is graphically shown in FIG. 1. In FIG. 1, the vertical axis represents the conductivity $\sigma$ representing any suitable scale and the horizontal axis represents the time $t$ representing any suitable scale. The curve 1 in FIG. 1 represents the case in which the radiation input is suitably strong to bring the preserved conductivity to the saturation level, and the curve 2 represents the case in which the quantity of the radiation input is small. In this latter case, the conductivity varies along the curve 2*a* when the applied voltage is small or no voltage is applied, while the conductivity varies along the curve 2*b* when the applied voltage is large, and the conductivity is preserved at the preservation level. The photoconductor is in the state of intrinsic dark conductivity $\sigma$D1 before time $t_0$ and is illuminated with radiation between the time $t_0$ and time $t_1$. THe conductivity $\sigma$D2 or $\sigma$D2′ after the time $t_1$ shows the preservation level. At time $t_2$, infrared rays are directed to the photoconductor with the result that either preserved conductivity level is lowered down to the level $\sigma$D1. A notable feature that should be emphasized resides in the fact that the preserved conductivity level 2*a* in the curve 2 depends upon the quantity of the radiation input, that is, the product of the intensity of the radiation input and the time of illumination, or in other words, upon the total number of photons impinged against the photoconductor. The preserved conductivity level can freely be set at any level between the level of the intrinsic dark conductivity and the saturation level of the preserved conductivity depending upon the number of photons impinging against the photoconductor. Furthermore, the intermediate level of conductivity preservation is determined as a time-based integral of the radiation input. More precisely, the effect obtained by illumination with radiation having a very weak intensity for a long period of time is similar to the effect obtained by illumination with radiation having a strong intensity for a short period of time. Furthermore, it is possible by further illumination with radiation to raise a certain intermediate preservation level up to a further higher preserved conductivity level.

Figure 2:
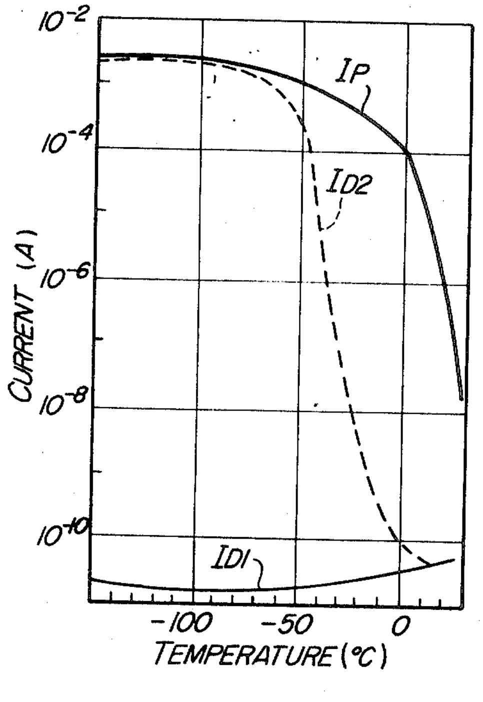

FIG. 2 shows the results of measurements of the intrinsic dark current $I_{D1}$, photocurrent $I_p$ and preserved current $I_{D2}$ in amperes which are plotted as a function of temperature T in degrees centigrade. The specimen employed in the test comprised powdery cadmium selenide doped with copper and bromine, which was bonded to an electrode of 7 mm. ×0.7 mm. by a plastic resin binder. A DC voltage of 400 volts was applied to the specimen. The specimen was illuminated with light of 0.2 lux emitted from an incandescent lamp. The properties of the photoconductor described above are clearly seen from FIG. 2. It will be seen from the curve representing the preserved current $I_{D2}$ that an effective temperature lower than −30° C. is preferable when the above-described material is used to form a memory element. More especially, an effective temperature lower than −50° C. is desirable considering a fluctuation in the preservation level due to a minute variation in the temperature.

ALthough the actualities of the phenomenon of conductivity preservation in response to triggering with radiation have not yet been clarified substantially, it is possible to interpret the occurrence of the phenomenon in the following manner. The impurities added to the cadmium selenide establish impurity levels in the forbidden band of cadmium selenide and these impurity levels contribute to the sensitization of the photoconductor at room temperature. More precisely, among the pairs of electrons and holes produced as a result of illumination with the radiation input, the holes are readily captured in the impurity levels so as to give rise to the state of so-called sensitization and act to reduce the probability of recombination with electrons which are the carriers of the charge. Thus, the lifetime of the electrons can be extended resulting in a high photoconductivity. After cessation of excitation with the radiation, the holes captured at room temperature are thermally excited into the valence band with a certain probability and then recombine with the electrons at the recombination centers. Therefore, the state of sensitization described above is extinguished with a certain time constant after the cessation of excitation with the radiation and is restored to the original state which existed before being excited. However, in a situation in which the probability of thermal excitation of the holes, which have been captured at a suitable low temperature, into the valence band after the cessation of excitation with the radiation is very little, the probability of the electrons ending their lifetime due to recombination becomes very little too. In such a situation, a state which is the same as the state of sensitization at room temperature is preserved for a long period of time even after the cessation of excitation with the radiation. Further, this state is maintained for a desired period of time so long as the injection of the electrons and holes from the electrode continues.

From the foregoing discussion, it may be considered that the storage effect in the memory element according to the present invention results from the fact that the holes are, as it were, kept in a frozen state in the impurity levels in the electronic processes taking place within the photoconductor. The frozen state can be restored to the original state which existed before the excitation when the photoconductor is illuminated with infrared rays or heated up to a certain temperature so as to optically or thermally excite the holes into the valence band, thereby restoring the preserved conductivity level established after cessation of the excitation to the level of intrinsic dark conductivity at any desired time. This infrared rays referred to here above are used to bring forth an increase in the recombination rate of electrons with the holes which have been trapped in the impurity levels in the sensitized state of the photoconductor and are then discharged into the valence band. Therefore, the infrared rays must have such a wavelength which will give rise to the so-called infrared quenching. In this respect, radiation having a wavelength of about 1.2 micron to 1.8 micron gives good results when used with photoconductive cadmium sulfide, cadmium selenide, cadmium sulfide-cadmium selenide solid solution and the like.

The intermediate level of preserved conductivity described with reference to FIG. 1 appears when the number of photons in a radiation input is too small to energize all the impurity centers, which contribute to the sensitization of the photoconductor as described above, to their sensitized state. When however, an electric field having a strength higher than a certain fixed value is applied across the electrodes, the electrons and holes injected from the electrodes act to drive all the impurity centers to their sensitized state in a certain period of time thereby increasing the conductivity up to the saturated preservation level. On the other hand, when no electric field is applied or when the electric field having a strength lower than the fixed value is applied to the electrode, the number of injected electrons and holes is negligibly small so that the intermediate level of preserved conductivity can be maintained without any variation therein. The dependence of the intermediate level of preserved conductivity on the radiation input as a time-based integral of the latter will be understood by considering the fact that the intermediate level of preserved conductivity depends upon the number of those impurity centers which are brought to their sensitized state by the protons delivered from the radiation input.

The above interpretation has been merely given so that those skilled in the art can properly understand the spirit of the present invention and it is to be understood that the phenomenon of conductivity preservation occurring in response to triggering of a specific photoconductor by radiation may be construed in any other way.

While photoconductive cadmium selenide doped with impurities has been taken as an example for the purpose of illustrating the present invention, it will be understood that photoconductive cadmium sulfide or cadmium sulfide-cadmium selenide solid solution has similar properties and behaves in a similar way.

The radiation signal memory device of the present invention which utilizes the phenomenon of conductivity preservation based on triggering of a photoconductor with radiation may be embodied in several forms depending on how the signal written in and stored by the radiation is read out. In the memory device according to the present invention, the signal is written in and stored in the form of conductivity. Accordingly, it is a problem as to how the conductivity is detected in reading out the signal. This may be done by conventional means for conductivity detection. In the other case, a signal written in and stored in a two-dimensional fashion may be used to control the luminescence of a two-dimensional luminescent element so that the signal can be read out in the form of a two-dimensional pattern of light. The signal written in and stored in the two-dimensional fashion may also be read out by scanning with an electron beam. The device of the present invention is also useful as a two-dimensional radiation signal memory device or an image taking and storage device.

Several practical forms of the present invention will now be described in detail with reference to the drawings.

EXAMPLE 1

Figure 3:
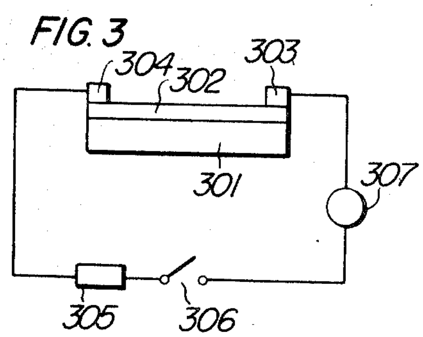
FIGS. 3, 4, 5, 6 and 7 are schematic views showing the structure of several embodiments of the signal memory device according to the present invention.

FIG. 3 is a schematic view of an embodiment of the present invention. The memory device comprises a memory element including a glass baseplate 301 and a coating 302 of photoconductor doped with impurities. The photoconductor may be any one of or any mixture of photoconductive cadmium sulfide, cadmium selenide, and cadmium sulfide-cadmium selenide solid solution. In this embodiment, powdery photo-conductive cadmium sulfide-cadmium selenide solid solution containing 10 percent by weight cadmium sulfide is coated on the glass baseplate 301 by a plastic binder. A pair of spaced electrodes 303 and 304 of indium are provided on the photoconductor coating 302. In this embodiment, the electrodes 303 and 304 have a width of 7 mm. and are spaced apart by a distance of 0.7 mm. A voltage supply 305, a switch 306 and an ammeter 307 are connected with the electrodes 303 and 304 in a manner as shown in order to detect the conductivity stored in the photoconductor between the electrodes 303 and 304. The memory element is placed in a conventional vacuum cooling vessel and is cooled down to −100° C. As described previously, the cooling temperature is relatively optional and may be a suitable value below −50° C.

Although not shown in FIG. 3, the memory element is associated with a source of radiation supply and a source of infrared ray supply so that the photoconductor 302 can be illuminated with the radiation and infrared rays. Considering the spectroscopic sensitivity of the powdery cadmium sulfide-cadmium selenide solid solution which is in the range of from about 0.6 micron to about 1.1 microns, the source of radiation supply is required to emit radiant rays including at least a wavelength which falls within the above-specified range or radiant rays such as X-rays and radioactive rays. In the embodiment, a conventional tungsten incandescent lamp was used as the source of radiation supply. Further, in order to have good results, the source of infrared ray supply is required to emit radiant rays including a wavelength which gives rise to the aforesaid effect of infrared quenching, that is, a wavelength in the order of from 1.2 microns to 1.8 microns.

At first, the memory element having the structure described above is cooled down to a suitable low temperature below −50° C. and the photoconductor 302 is illuminated with infrared rays from the source of infrared ray supply or exposed to a temperature above 0° C., so that the photoconductor 302 takes a state of intrinsic dark conductivity which is very low. In the above state of the photoconductor 302, the photoconductor 302 is illuminated with the radiation from the source of radiation supply with the result that the conductivity of the photoconductor 302 increases depending on the intensity of radiation. Even after the radiation ceases to illuminate the photoconductor 302, the state of high conductivity can be stored for any desired period of time because of the phenomenon of conductivity preservation resulting from the triggering by the radiation. The signal so stored can be read out as desired by closing the switch 306 for connecting the voltage supply 305 with the electrodes 303 and 304 and then taking the reading appearing on the ammeter 307. A good result could be obtained with a DC voltage of 200 volts.

When it is desired to erase the stored signal and to store another signal subsequently, the infrared rays or high temperature may be applied to the photoconductor 302 again thereby setting up again the state of intrinsic dark conductivity in the photoconductor 302. Then, a desired radiation signal may be applied to the photoconductor 302 to store the signal therein. The process of setting up the state of intrinsic dark conductivity, the process of applying a radiation signal and the process of erasing the stored signal can be identified by closing the switch 306 and taking the reading appearing on the ammeter 307. While the signal has been stored in the form of a high conductivity in the above operation, it is apparent from the aforesaid basic principle that, after the radiation is applied to establish the state of a high conductivity in the photoconductor 302, a signal in the form of infrared rays may be applied thereto so that the signal may be stored in a state of low conductivity.

When the signal is stored at a conductivity level which is lower than the saturated conductivity level, it is desirable to select the applied voltage at a relatively small value or to cut off the applied voltage and apply the same only during the readout operation of the signal. This is because, in the state in which a high voltage is continuously applied, the intermediate level of preservation increases gradually until finally the saturated conductivity level is reached.

The shape of the electrodes is in no way limited to that shown in this embodiment, and various changes and modifications may be made in the shape thereof without departing from the spirit of the present invention, including the shape of a comb, parallelly arranged planar strips, parallelly arranged wires or the like consisting of a metal, conductive paint or nesa.

The voltage supply 305 may be either an AC voltage supply or a DC voltage supply. Since the switch 306, the ammeter 307 and the voltage supply 305 in the present embodiment are provided to detect the conductivity in the individual processes taking place in the memory element of the present invention, it is apparent that any other means for detecting the conductivity may be employed in lieu thereof.

EXAMPLE 2

Figure 4:
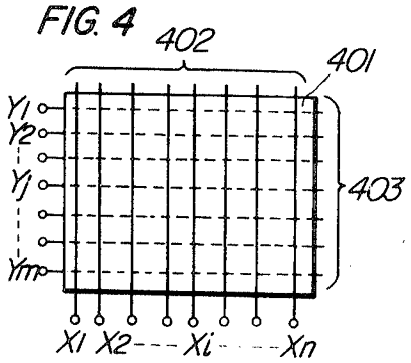

FIG. 4 shows another embodiment of the present invention which comprises a memory plate consisting of a multiplicity of memory elements arranged in a two-dimensional fashion for independently storing a multiplicity of signals. THe memory plate comprises a layer 401 of photoconductor as described above showing the phenomenon of conductivity preservation in response to triggering with radiation, and a multiplicity of linear electrodes 402 and 403 provided in perpendicularly crossing relation with each other on one surface and on the opposite surface of the photoconductor layer 401, respectively. For example, such memory plate may be obtained by coating a multiplicity of parallel electrodes 403 of material such as tin oxide on one surface of a glass baseplate, coating the photoconductor on the same surface of the glass baseplate by use of a plastic resin binder, and then evaporating a metal on the photoconductor layer to provide a multiplicity of parallel electrodes 402 which are perpendicular with respect to the electrodes 403. In the present embodiment, powdery photoconductive cadmium selenide doped with copper and chlorine was coated in a thickness of 60 microns. The memory plate having such a structure is cooled down to a temperature below −50° C. to place the photoconductor in the state of intrinsic dark conductivity and a radiation signal is applied to an optional position of the memory plate. Such a position is represented by the X and Y coordinates at the intersection of the respective linear electrodes 402 and 403. The conductivities at the intersections of the linear electrodes 402 having the coordinates $X_1$ to $X_n$ and the linear electrodes 403 having the coordinates $Y_1$ to $Y_m$ vary depending on respective radiation signals applied thereto and are stored thereat for any desired period of time due to the phenomenon of conductivity preservation occuring in response to triggering with the radiation and persisting even after the application of the radiation signals is ceased.

The signal stored at the required position can easily be known be detecting the conductivity between the linear electrodes 402 and 403 at the intersection corresponding to the particular position. For example, when it is desired to store a signal at a point represented by coordinates $X_i$ and $Y_j$ on the memory plate, radiation may be directed to such a point, and when it is desired to read out the signal, a voltage supply may be connected with the specific terminals $X_i$ and $Y_j$ so as to derive the conductivity in the form of an electrical signal. Concerning the memory plate its operating principle, operating conditions, kind of radiation, method of erasing, etc. can be understood in the same manner as that in which the previous embodiment is understood.

In the readout operation, the output signal may be derived not only in the form of an electrical signal but also in the from of an optical signal. Such an optical signal can be delivered from an electrically luminescent body whose luminous output intensity is variable depending on an electrical signal.

The last-mentioned embodiment provides a solid-state image memory plate which can store a radiation image and from which the stored image can be derived in the form of an optical output as required. Thus, the memory device is quite useful as a means for converting two-dimensionally distributed radiation signals into corresponding optical signals instead of electrical output signals.

The basic principle of the solid-state image memory plate employing the photoconductor will be described in detail.

The solid-state image memory plate according to the present invention comprises essentially a photoconductor element such as those of photoconductive cadmium selenide doped with impurities as described above and an electrically luminescent element, and is so constructed that the luminescence of the electrically luminescent element is electrically controlled in relation to a variation in the impedance of the photoconductor element of cadmium selenide. For example, the photoconductive cadmium selenide layer and the electrically luminescent material layer are electrically connected in series or in parallel with each other in an electric circuit having at least one AC voltage supply, and the assembly is placed in a suitable low-temperature vessel which can be cooled down to a temperature below −30° C. The photoconductor layer is associated with an optical system for projecting to the photoconductor layer a radiation image or an X-ray having a wavelength to which the photoconductor has a spectroscopic sensitivity or X-ray or radioactive ray image. The photoconductor layer is further associated with means for directing uniform infrared light thereto. Considering the fact that the photoconductive cadmium selenide doped with impurities is sensitive to a wavelength of the order of 0.6 to 1.1 microns, the image is preferably in the form of radiant rays including a wavelength falling within the above-specified range or radiant such as X-rays and radioactive rays. As for infrared rays, good results can be obtained when the source of infrared rays emits a radiation which gives rise to the infrared quenching described previously, that is, a radiation including a wavelength of the order of 1.2 to 1.8 microns.

The solid-state image memory plate is cooled down to a suitable low temperature below −30° C. and an AC voltage is applied thereto. Infrared rays are directed uniformly from the source of infrared light to the entire surface of the photoconductor layer to place the photoconductor layer in the state of intrinsic dark resistance having an extremely high resistivity, and the emission of infrared rays is stopped as soon as such a state is established. Consider now a case in which the photoconductor layer is electrically connected in series with the electrically luminescent material layer. In such a case, the electrically luminescent material layer does not luminesce since the applied voltage is almost entirely distributed to the photoconductor layer due to the fact that the photoconductor has an extremely high resistivity. When a radiation image input is projected on the photoconductor in the above state, the resistance of the photoconductor decreases depending on the intensity of radiation forming the image, and consequently a larger voltage is distributed to the electrically luminescent material layer depending on a decrement of the resistance of the photoconductor so that a converted output image appears on the electrically luminescent material layer. Then, when projection of the input image is ceased, a reduction in the output image takes place, but such a reduction is negligibly small. Since, in the meantime, the state of high conductivity persists in the photoconductor for any desired period of time due to the phenomenon of conductivity preservation as a result of triggering with the radiation, the output image can continuously be stored without any blurring or fading. Erasing of the image thus stored may easily be done at any desired time by directing uniformly the infrared rays from the source of infrared light to the entire surface of the photoconductor layer or exposing the photoconductor layer to a suitable temperature of the order of 0° C.

The same device can serve the conversion and storage of an infrared ray image or a thermic ray image. In such a case, radiation is directed to the entire surface of the photoconductor layer to energize the same, and then the radiation is removed, thereby preserving bright luminescence all over the electrically luminescent material layer. In the above state, an image of infrared rays or thermic rays having the above-specified wavelength is projected through an optical system on the photoconductor layer. The luminescence of the electrically luminescent material layer is decreased thereby due to an increase in the resistance of those portions of the photoconductor layer illuminated with the infrared or thermic rays, and as a result, a visible output image having a negative polarity with respect to the input image is displayed on and stored in the electrically luminescent material layer. This output image is stored for any desired period of time like in the aforementioned case. When it is especially desired to store an image of half tone, voltage having a suitably low value may be applied during the stage of storage or application of voltage may be ceased during the stage of storage and such a voltage may only be applied during the stage of observation. In a state in which a relatively large voltage is kept applied to the photoconductor layer during the stage of image storage, the conductivity of those portions of the photoconductor layer which are not illuminated with the radiation as well as the conductivity of those portions of the photoconductor layer which are intensely illuminated with the radiation remains unvaried, while the conductivity of intermediate portions increases in a manner as described previously until finally the saturated conductivity level is reached whereby the half tone is lost and the resultant image has a very high contrast. This does not, however, apply to a specific case in which storage of an image having a half tone is not desired. The fact that the intermediate conductivity level increases due to application of voltage may be utilized to observe a stored image of a radiation input having a low contrast as an image having any desired black-to-white ration, gamma value, etc. More precisely, when a radiation image is projected under application of a low voltage or no voltage and then the voltage is increased as required, the conductivity of each individual portion of the photoconductor layer increases at a rate which is proportional to the magnitude of conductivity previously possessed by the specific portion. The voltage may be reduced as soon as a required contrast is obtained. The image having such a contrast may be observed or storage thereof may be further continued.

The above description has referred to image conversion and storage in a case in which the solid-state image memory plate comprises a photoconductor layer electrically connected in series with an electrically luminescent material layer, that is, the high light portion of a radiation input image including a wavelength falling within the spectroscopic sensitivity range of the photoconductor corresponds to the highlight portion of an output image (this is contrary in the case of an infrared ray image). However, it will be understood that a principle similar to the one here above applies also to a case in which the photoconductor layer is electrically connected in parallel with the electrically luminescent material layer and the high light and low light portions of a radiation input image correspond respectively to the low light and high light portions of an output image (this is contrary to the case of an infrared ray image). Furthermore, as will be easily conceived from the property of the photoconductor described above, it is apparent that the actuating AC voltage may not be applied during the stage of projection of an input image or during the stage of storage of such an input image and may merely be applied during the stage of observation of the stored image.

EXAMPLE 3

Another embodiment of the solid-state image memory device according to the present invention will be described in detail with reference to FIG. 5. The device comprises a transparent baseplate 501 of material such as glass, a transparent electrode 502 coated on the transparent baseplate 501, an electrically luminescent layer 503 about 40 microns thick made by binding an electrically luminescent material such as zinc sulfide by a plastic binder, a light reflecting and insulating layer 504 about 10 microns thick made by binding powdery barium titanate or like material by a plastic binder, an opaque or light-impervious layer 505 of material such as black paint or carbon black about 10 microns thick for preventing undesirable feedback of light from the side of the electrically luminescent material layer 503, and a photoconductor layer 506 about 60 microns thick made by binding a photoconductor by a plastic binder. In this embodiment, powdery photoconductive cadmium selenide activated with copper and bromine was employed to form the photoconductor layer 506. A plurality of parallel electrodes 507 such as metal wires having a diameter of the order of 10 microns are arranged on the photoconductor layer 506 with a pitch of about 400 microns. An AC voltage supply 51 is connected between the transparent electrode 502 and the electrodes 507. An applied voltage of 250 volts and a frequency of the order of 2 kilocycles give good results.

The solid-state memory plate having a structure as described above is placed in a vacuum cooling vessel of the kind commonly employed in experiments at low temperatures and is cooled down to a temperature below −30° C. As will be seen from FIG. 2, a temperature below −50° C. is recommended in order to minimize the undesirable variation in current due to temperature fluctuation. A conventional incandescent lamp is used to project a radiation image on the photoconductor layer 506 and is then removed, thereby storing the image by the aforementioned phenomenon of conductivity preservation in response to triggering with radiation. The image can be stored for a long period of time without any substantial deterioration in its quality. The stored image can easily be erased by directing infrared rays having a wavelength of 1.4 microns from a source of infrared light to the photoconductor layer 506 or exposing the image memory plate to a temperature above 0° C. It is apparent that a similar result can be obtained when the image is projected in the form of radiant rays such as X-rays or radioactive rays.

After the radiation from the incandescent lamp illuminates uniformly the entire surface of the photoconductor layer 506 to cause uniform luminescence of the electrically luminescent material layer 503, an infrared ray image may be projected to convert and store the image in the form of visible light. The image stored in this form can rapidly be erased when uniformly illuminated with radiation from the incandescent lamp or with infrared rays from the source of infrared light. Further, storage of an image having a half tone or of an image having an increased black-to-white ratio or gamma value can be attained with a good result by utilizing the effect of increasing the intermediate conductivity due to application of voltage. According to this embodiment, an image projected with radiation from the incandescent lamp is converted and stored in the form of a positive image, while an image projected with infrared rays from the source of infrared light is converted and stored in the form of a negative image.

Figure 5:
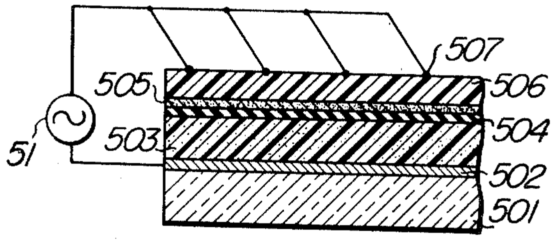
Figure 6:
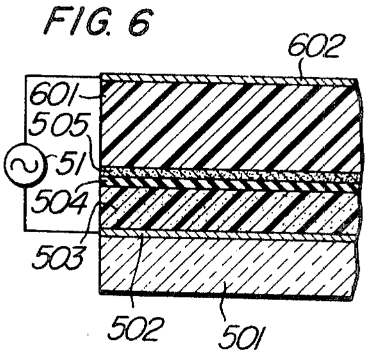

A modification of the memory plate shown in FIG. 5 is illustrated in FIG. 6 in which like reference numerals are used to denote like parts appearing in FIG. 5. Thus, parts 501 through 505 and an AC voltage supply 51 are similar in regard to material and structure to those shown in FIG. 5. The memory plate in FIG. 6 differs from that shown in FIG. 5. The memory plate in FIG. 6 differs from that shown in FIG. 5 in that a photoconductor layer 601 has a thickness in the order of 400 microns, although it is made from the same material as that employed in the layer 506 in FIG. 5. The photoconductor layer 601 has such a large thickness so as to increase the equivalent dark resistance thereof which tends to decrease as the photoconductor layer 601 is associated with a planar second electrode 602 deposited by evaporation of metal.

The memory plate having a structure as described above is useful when a radiation imagc such as an X-ray image having a high penetrating power is used as an input since its photoconductor layer is relatively thick. While the second electrode in FIGS. 5 and 6 has been illustrated as a plurality of parallelly spaced metal wires and a planar electrode, respectively, it will be apparent to those skilled in the art that a gapped metal electrode, netlike electrode or transparent planar electrode may be employed in lieu thereof without departing from the spirit of the present invention.

EXAMPLE 4

Figure 7:
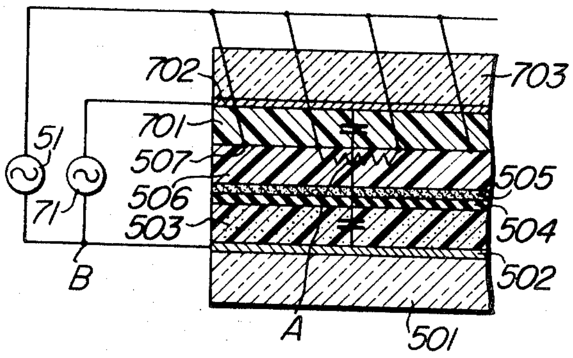

Another embodiment of the present invention shown schematically in FIG. 7 has such a structure that a photoconductor layer 506 and an electrically luminescent material layer 503 are connected with two AC voltage supplies 51 and 71 so that they can be electrically connected in series or in parallel with each other by regulating the supply voltage from these voltage sources. The black-to-white ratio, gamma value, etc. of an output image can be adjusted by selecting the AC voltage supplies so as to generate voltages of the same frequency and by suitably controlling the phase thereof.

The memory plate comprises parts 501 through 507 which are similar to those shown in FIG. 5. The AC voltage supply 51 is similar to the AC voltage supply 51 shown in FIG. 5. A transparent layer 701 of dielectric material such as polyester resin about 40 microns thick is disposed on the photoconductor layer 506, and a transparent third electrode 702 is coated on a transparent baseplate 703 of glass or like material.

The memory plate operates in a manner similar to the memory plate shown in FIG. 5 when the voltage supply 51 in the power supply system is set to generate a voltage of 250 volts at a frequency of 2 kilocycles and the voltage supply 71 is set at zero volt. The voltage supply 71 may be set to generate a voltage which is identical in frequency but opposite in phase to the voltage generated by the voltage supply 51 so that the dark current developed as a result of voltage application from the voltage supply 51 can be compensated for by the current of opposite phase developed as a result of voltage application from the voltage supply 71 when the photoconductor is in the state of intrinsic dark conductivity. Since the dark luminescence of the electrically luminescent material layer is thereby suppressed, the output image has an increased black-to-white ratio and gamma value and is converted and stored in a form having a good contrast. In this type of operation, the voltage generated by the voltage supply 71 may be selected to lie within a range of 0 to 800 volts. The black-to-white ratio and gamma value of the output image are decreased when the voltage supply 71 applies a voltage which is of the same frequency and same phase as the voltage applied by the voltage supply 51.

Figure 8:
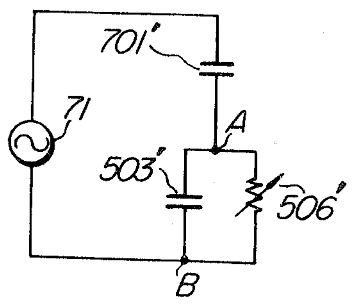
FIG. 8 is an equivalent circuit diagram of the embodiment shown in FIG. 7.

In another type of operation, the voltage supply 51 generates no voltage or is short circuited and the voltage supply 71 solely applies a voltage which is preferably 1,500 volts at a frequency in the order of 2 kilocycles. According to this method of power supply, the electrode 502 and the electrodes 507 are at the same potential, and as will be apparent from an equivalent circuit shown in FIG. 8, the photoconductor layer 506 and the electrically luminescent material layer 503 are connected in parallel with each other. Referring to FIG. 8, reference numerals 503′, 506′, and 701′ correspond to the electrically luminescent material layer 503, photoconductor layer 506 and transparent dielectric layer 701 in FIG. 7, respectively. The same voltage supply 71 is shown in FIG. 8. For convenience of explanation, the capacitance component as well as the resistance component in the direction of the thickness of the photoconductor and the capacitance components of the layers 504 and 505 are not shown in the equivalent circuit. However, it is apparent that the common application would not be reduced for that reason as far as the operation of this specific embodiment is concerned.

Referring to FIG. 8, when the photoconductor 506′ is placed in the state of intrinsic dark conductivity, a high impedance appears across the terminals A and B so that the greater portion of the voltage is applied thereacross and the electrically luminescent body 503′ luminesces bright. When an input image is projected on the photoconductor 506′ and then removed, those portions of the photoconductor 506′ which are hit by the radiation are placed in the state of residual conductivity thereby reducing the impedance between the terminals A and B. As a result, less voltage is now applied thereacross, the electrically luminescent body 503′ luminesces less, and a converted output image which is negative with respect to the input is thereby stored. Erasing of the image can be effected by uniform irradiation with infrared rays in a manner as described previously. Needless to say, a positive and visible infrared ray image can be stored when the infrared ray image is projected after the photoconductor is uniformly illuminated with incandescent light.

While the electrode 507 is illustrated as a plurality of parallelly arranged metal wires in FIG. 7, good results can also be obtained with a single metal electrode of a gapped structure such as a netlike electrode. Furthermore, the supply of voltage need not be made during the stage of image projection, the stage of storage or the stage of erasing, and may be made only during the stage of observation as described previously. A notable feature of the present embodiment resides in the fact that the black-to-white ratio or gamma value of the output image can freely be adjusted by controlling the phase and voltage of the two AC voltage supplies during the stage of observation of the stored image.

In reading out a conductivity pattern stored in the photoconductor layer in a two-dimensional fashion, the photoconductor layer which is covered at one surface thereof with the transparent electrode may be enclosed in an evacuated electronic tube and a scanning electron beam may be directed thereto through the transparent electrode for deriving a signal which may then be read out. A conventional television system may be utilized for the scanning with the electron beam, thereby displaying the stored two-dimensional radiation signal on the television screen.

It will be apparent for those skilled in the art that many changes and modifications may be made in the various embodiments described hereinabove.

For the effective practice of the present invention, examples 1 and 2 will be summarized as follows:

A solid-state memory device comprising essentially a photoconductor is placed in a means capable of cooling and heating and is cooled down to a suitable low temperature below −30° C. when storage of a signal is desired. The signal that is stored takes the form of (1) radiant rays having a wavelength which falls within the spectroscopic sensitivity range of the photoconductor or radiant rays such as X-rays and radioactive rays, or (2) radiant rays giving rise to infrared quenching or heat. In the case of the signal (1), the signal is stored in the form of a higher conductivity than when no signal is applied to the photoconductor, while in the case of the signal (2), the signal is stored in the form of a lower conductivity than when no signal is applied to the photoconductor. The conductivity of the photoconductor is detected for the readout of the stored signal. For example, the signal may be read out by connecting a power supply with the photoconductor so that the latter acts as a load of the former and the current or voltage corresponding to the impedance of the photoconductor is read out, or by further connecting an electrically luminescent body in series or in parallel with the impedance for reading out the luminous intensity of the electrically luminescent body. In the readout operation, the applied voltage may be suitably increased so that the magnitude of the signal stored at, for example, an intermediate conductivity level depending on the magnitude of the input signal is gradually increased until finally a saturated conductivity level is reached. Since the conductivity at such a level is considerably higher than when no signal is applied, the applied voltage may be lowered down to a suitable level corresponding to a desired conductivity, thereby detecting the signal at such a level and then further continuing the storage of the signal. The applied voltage may optionally be determined in case the storage at the intermediate conductivity level is not desired. The stored signal can be erased by heating the photoconductor to a temperature above −30° C., for example, to about 0° C. Further, in the case of the signal (1), erasing may be effected by illuminating the photoconductor with radiant rays bringing forth the infrared quenching, while in the case of the signal (2), erasing may be effected by illuminating the photoconductor with radiant rays having a wavelength falling within the spectroscopic sensitivity range of the photoconductor, X-rays or radioactive rays.

For the effective practice of the present invention, examples 3 and 4 will be summarized as follows:

A solid-state image device comprising essentially a photoconductor and an electrically luminescent body, wherein the luminescence of the electrically luminescent body can be controlled in response to a variation in the impedance of the photoconductor, is placed in a means capable of cooling and heating. The image device is cooled down to a suitable low temperature below −30° C. when storage of an image is desired. The image signal that is stored takes the form of (1) radiant rays having a wavelength which falls within the spectroscopic sensitivity range of the photoconductor or radiant rays such as X-rays and radioactive rays, or (2) radiant rays giving rise to infrared quenching or heat. In the case of the signal (1), an output image which is positive with respect to the input can be obtained, while in the case of the signal (2), an output image which is negative with respect to the input can be obtained. For the observation of the output image, voltage is applied to the solid-state image device so as to cause the electrically luminescent body to luminesce with a luminous intensity distribution corresponding to the impedance of various portions of the photoconductor. In the readout operation, the applied voltage may be suitably increased so that the contrast of the image having a half tone is gradually increased until finally the image possesses a very high contrast in which all the illuminated portions reach the saturated level and there are no halftone portions. The applied voltage may be lowered down to a suitable level corresponding to a desired contrast, thereby observing the image at such a contrast level and then further continuing the storage of the image. The applied voltage may optionally be determined in case the storage at the halftone level is not desired. The stored image can be erased by heating the image device to a temperature above −30° C., for example, to about 0° C. Further, in the case of the image signal (1), erasing may be effected by illuminating the photoconductor with radiant rays bringing forth infrared quenching, while in the case of the image signal (2), erasing may be effected by illuminating the photoconductor with radiant rays having a wavelength falling within the spectroscopic sensitivity range of the photoconductor.

It will be understood from the detailed description given here above that the memory device according to the present invention can store a signal, for any desired period of time, applied in the form of radiant rays ranging from visible light or radiant rays such as X-rays and radioactive rays to near infrared light. The signal so stored can easily be read out as an electrical signal or optical signal and can also easily be erased. Thus, the image device according to the present invention finds a variety of useful applications including a memory device for use in data processing equipment in electronic computers, or a two-dimensional memory device or image memory device for X-rays, visible light, infrared light, etc. used in medical and industrial equipment.

What is claimed is:

1. A radiation signal memory device comprising a photoconductor element essentially composed of at least one photoconductor material selected from the group consisting of cadmium selenide, cadmium sulfide, and cadmium sulfoselenide;

a set of electrodes associated with said photoconductor element;

means for detecting the conductivity of said photoconductor element; and means for cooling said photoconductor element to a temperature equal to or lower than −30° C. to endow said photoconductor element with a memory characteristic of conductivity in response to triggering with radiation, said memory characteristic being extinguishable by heating or infrared irradiation; and further, wherein said set of electrodes comprise a first group of nonintersecting linear electrodes provided on one surface of said photoconductor element and a second group of nonintersecting linear electrodes provided on the opposite surface of said photoconductor element, said first group of electrodes and said second group of electrodes intersecting with each other, whereby said device can store a plurality of radiation signals at said intersections independently of one another.

2. A radiation signal memory device comprising a photoconductor element essentially composed of at least one photoconductor material selected from the group consisting of cadmium selenide, cadmium sulfide, and cadmium sulfoselenide;

a set of electrodes associated with said photoconductor element;

means for detecting the conductivity of said photoconductor element; and means for cooling said photoconductor element to a temperature equal to or lower than −30° C. to endow said photoconductor element with a memory characteristic of conductivity in response to triggering with radiation, said memory characteristic being extinguishable by heating or infrared irradiation; and further, wherein said means for detecting the conductivity is an electroluminescent layer, and said set of electrodes comprises a radiation-pervious electrode in a gapped form provided on said photoconductor element on the input side and a light-pervious planar electrode provided on the output side of said electroluminescent layer.

3. A radiation signal memory device according to claim 2, comprising a radiation-pervious impedance layer disposed on the said gapped electrode side of said photoconductor element, and a radiation-pervious planar electrode disposed on the input side of said radiation-pervious impedance layer, whereby the polarity inversion, gamma and black-to-white ratio of the image can be adjusted.